United States Patent [19]

Albright, Jr. et al.

[11] Patent Number: 4,588,040
[45] Date of Patent: May 13, 1986

[54] HYBRID POWER SYSTEM FOR DRIVING A MOTOR VEHICLE

[76] Inventors: Harold D. Albright, Jr., 2201 Providence Rd., Charlotte, N.C. 28211; William R. Rollins, 30 Dawn Dr., South Windsor, Conn. 06074

[21] Appl. No.: 564,742

[22] Filed: Dec. 22, 1983

[51] Int. Cl.$^4$ .............................................. B60K 9/04
[52] U.S. Cl. ..................................... 180/165; 74/572; 180/65.4; 180/69.6
[58] Field of Search ...................... 180/165, 65.2, 65.4, 180/69.6; 60/718; 74/572, 751, 689, 675, 682, 686, 705, 665 B, 661; 192/0.098, 0.082, 0.076, 0.055, 4 A

[56] References Cited

U.S. PATENT DOCUMENTS

| | | | |
|---|---|---|---|
| 3,493,066 | 2/1970 | Dooley | 74/572 |
| 3,641,843 | 2/1972 | Lemmens | 180/165 |
| 3,665,788 | 5/1972 | Nyman | 74/751 |
| 3,732,751 | 5/1973 | Berman et al. | 180/65.2 |
| 3,861,484 | 1/1975 | Joslin | 74/675 |
| 3,861,485 | 1/1975 | Busch | 180/165 |
| 3,870,116 | 3/1975 | Seliber | 180/165 |
| 3,923,115 | 12/1975 | Helling | 180/165 |
| 4,042,056 | 8/1977 | Horwinski | 180/65.2 |
| 4,131,171 | 12/1978 | Keyes | 74/572 |
| 4,187,741 | 2/1980 | Nyman | 74/751 |
| 4,233,858 | 11/1980 | Rowlett | 74/675 |
| 4,305,488 | 12/1981 | McIntosh | 192/4 A |
| 4,405,029 | 9/1983 | Hunt | 74/661 |

OTHER PUBLICATIONS

"For the Latest in Energy Storage", Feb. 1978, Chang et al.
"Computer Simulation of an Advance Hybrid Electric Powered Vehicle", Jul. 1984, Chang.
"Hybrid Drive with Flywheel Component for Economic and Dynamic Operation", Delivered Feb. 1974 at Electric Vehicle Symposium, by Helling et al.

Primary Examiner—John J. Love
Assistant Examiner—Mark C. Dukes
Attorney, Agent, or Firm—Shefte, Pinckney & Sawyer

[57] ABSTRACT

A triple hybrid power system for driving a motor vehicle utilizing an internal combustion engine to drive an electric generator to charge a bank of batteries that provide electrical energy to drive an electric motor/generator that supplies power to a planetary gear set from which power is directed through a variable drive transmission to drive the wheels of the vehicle, a flywheel is used to apply periodic power through the planetary gear set to provide added power for acceleration, with a speed regulator disposed between the flywheel and the planetary gear set to maintain a substantially constant input speed that facilitates operation of the motor/generator at an optimum efficiency output. The drive transmission is operable to apply regenerative braking energy back through the planetary gear set to recharge the flywheel and, through to motor/generator, to recharge the batteries. When the vehicle is operating at a constant speed on level ground, the internal combustion engine can be applied directly to power the vehicle at optimum efficiency with the motor/generator and flywheel disengaged.

16 Claims, 7 Drawing Figures

HYBRID POWER SYSTEM FOR DRIVING A MOTOR VEHICLE

BACKGROUND OF INVENTION

The present invention relates to hybrid power systems for driving motor vehicles utilizing an electric motor and flywheel combination, and is more particularly directed to a hybrid power system for driving a motor vehicle with the system being capable of applying braking energy to recharge the electric batteries that power the electric motor and to recharge the kinetic energy in the flywheel.

The interest in hybrid power systems of this type has arisen primarily because of the increasing cost of fuel and the inefficiency of operation of conventional internal combustion engine power systems for motor vehicles. When an internal combustion engine is the sole source of power for a motor vehicle, the engine must be of sufficient size and capacity to deliver maximum power loads on demand for acceleration, even though such demands are occasional and the normal operation is at a much lower power demand range. The engine could operate much more efficiently if it could operate substantially continuously within an optimum efficiency operating range without maintaining the capability of providing an output substantially greater than this range. Utilizing an engine requiring operation only in the optimum efficiency operating range would allow the use of a less powerful and a much lighter engine with the obvious attendant economy.

Electric motors have been developed as substitutes for internal combustion engines, but they have been found to be generally unacceptable for universal usage in motor vehicles because of the limited energy storage capacity of electric storage batteries in relation to weight limitations for efficient vehicle application and because of the extended time that batteries must be out of operation for recharging.

Flywheels have also been utilized in attempts to store kinetic energy that can be delivered during times of peak load demand so that an internal combustion engine or an electric motor need not have the size and capacity necessary for delivering sufficient power in themselves during periods of acceleration. Flywheels also have the advantage of receiving energy generated during braking of the vehicle so that such energy that is normally dissipated as heat and not reused can be regenerated in the flywheel for subsequent delivery during peak load demands during acceleration. However, flywheels have the disadvantage of a reduction in the output speed of rotation as the energy is being dissipated, which is usually during periods of vehicle acceleration when rotational speeds are increasing otherwise.

Hybrid power systems have been designed utilizing flywheels in combination with internal combustion engines or with electric motors or with both, and internal combustion engines have been utilized to provide energy for charging batteries that provide power for electric motors, but none of these systems has found commercial acceptance.

Nyman U.S. Pat. No. 3,665,788 discloses a type of power system in which a flywheel is combined with an internal combustion engine to deliver energy during peak demands and to be recharged by the regenerative energy developed during braking. In this patent the flywheel is connected through a variable transmission and planetary gears to control the delivery of energy from and to the flywheel.

Dooley U.S. Pat. No. 3,493,066 discloses an internal combustion engine that has an auxiliary power take-off for charging a battery that drives an electric motor that in turn charges a flywheel, with the flywheel being utilized periodically to apply additional power through the internal combustion engine to handle peak load conditions. Nyman U.S. Pat. No. 4,187,741 discloses another example of combining a flywheel with the primary engine of a motor vehicle to apply peak power that can be regenerated during braking.

Helling U.S. Pat. No. 3,923,115 discloses the combination of an internal combustion engine, electric motor and flywheel wherein the electric motor and internal combustion engine are combined through a differential to apply power to the drive shaft while the flywheel is connected to the output of the internal combustion engine to apply energy during peak load, but as the energy from the flywheel is being dissipated, the rotational speed of the output will be decreasing even though the vehicle is accelerating. During braking, the regenerated energy is transferred back to the flywheel and through the electric motor, as a generator, to the battery. Also, the internal combustion engine is utilized to charge the flywheel and battery when its full power is not being utilized to drive the vehicle, but the batteries can not be charged during the periods of time that the electric motor is being utilized to deliver motive power.

SUMMARY OF THE INVENTION

By the present invention, an electric motor and a flywheel are combined in a unique manner that takes advantage of the efficiency and economy of an electric motor while utilizing a flywheel for acceleration, and having the capability for recharging both the electric battery and flywheel with energy regenerated during braking. To make the system practical for effective delivery of kinetic energy from the flywheel, particularly in relation to the energy being delivered from the electric motor, a speed regulator is provided to maintain a substantially constant rotational speed of application of energy from the flywheel, which itself is decreasing in speed during dissipation of its energy. Also, uniquely, the present invention provides for the use of an internal combustion engine for the continuous charging of the batteries that operate the electric motor so that the vehicle is capable of long range continued operation while taking advantage of the efficiencies and economies of electric motor and flywheel operation. In addition, the internal combustion engine of the power system of the present invention may be connected directly to drive the vehicle rather than functioning indirectly through the electric motor, which feature is of advantage when the vehicle is running at its designed maximum continuous speed.

Briefly described, in one embodiment of the present invention the hybrid power system includes an electric storage battery means that provides the electrical energy for operating an electric motor/generator. Flywheel means are provided for accumulating, storing and discharging kinetic energy. The flywheel and the electric motor/generator are connected through connecting means to a variable drive transmission for selective operation to drive the transmission from the motor/generator, the flywheel means or from both. The drive transmission is also adapted to transmit braking energy to the connecting means, which is operable to transmit the braking energy to the motor/generator to charge the battery means and to the flywheel means for accumulating kinetic energy in the flywheel means. Speed regulating means are provided to maintain a substantially constant rotational input speed to the connecting means from the flywheel means in response to variations in the rotational speed of the output from the flywheel means such that effective application of energy from the flywheel means in relation to input from the electric motor/generator can be attained.

In another embodiment of the present invention a triple hybrid power system is provided for driving a motor vehicle utilizing an internal combustion engine having an optimum efficiency operating range and which drives an electric generator to charge a bank of electric storage batteries. The batteries power an electric motor with means connecting the electric motor and flywheel means to a variable drive transmission. The connecting means is selectively operable to drive the transmission from the electric motor, from the flywheel means or from both the motor and flywheel means in combination, and the drive transmission is operable to transmit braking energy to the connecting means and thereby to the flywheel means for accumulation of kinetic energy therein. Preferably, the connecting means also includes means for connecting the output of the internal combustion engine to the drive transmission for driving the motor vehicle directly from the internal combustion engine rather than through the electric motor.

In the preferred form, the connecting means includes a planetary gear set connected for driving input from the electric motor, from the flywheel means, and selectively from the internal combustion engine. In this arrangement, the electric motor is connected to the ring gear of the planetary gear set, the flywheel means is connected to the sun gear, the drive transmission is connected to the spider assembly, and the internal combustion engine is selectively connected directly to the ring gear. This provides optimum combination of the energy sources and transfer of regenerative braking energy to both the electric motor/generator and the flywheel means. Also, with this arrangement the aforementioned speed regulating means applied to the output of the flywheel means will maintain a substantially constant rotational speed of the sun gear input into the planetary gear set.

DETAILED DESCRIPTION OF THE PREFERRED EMBODIMENT

Figure 1:
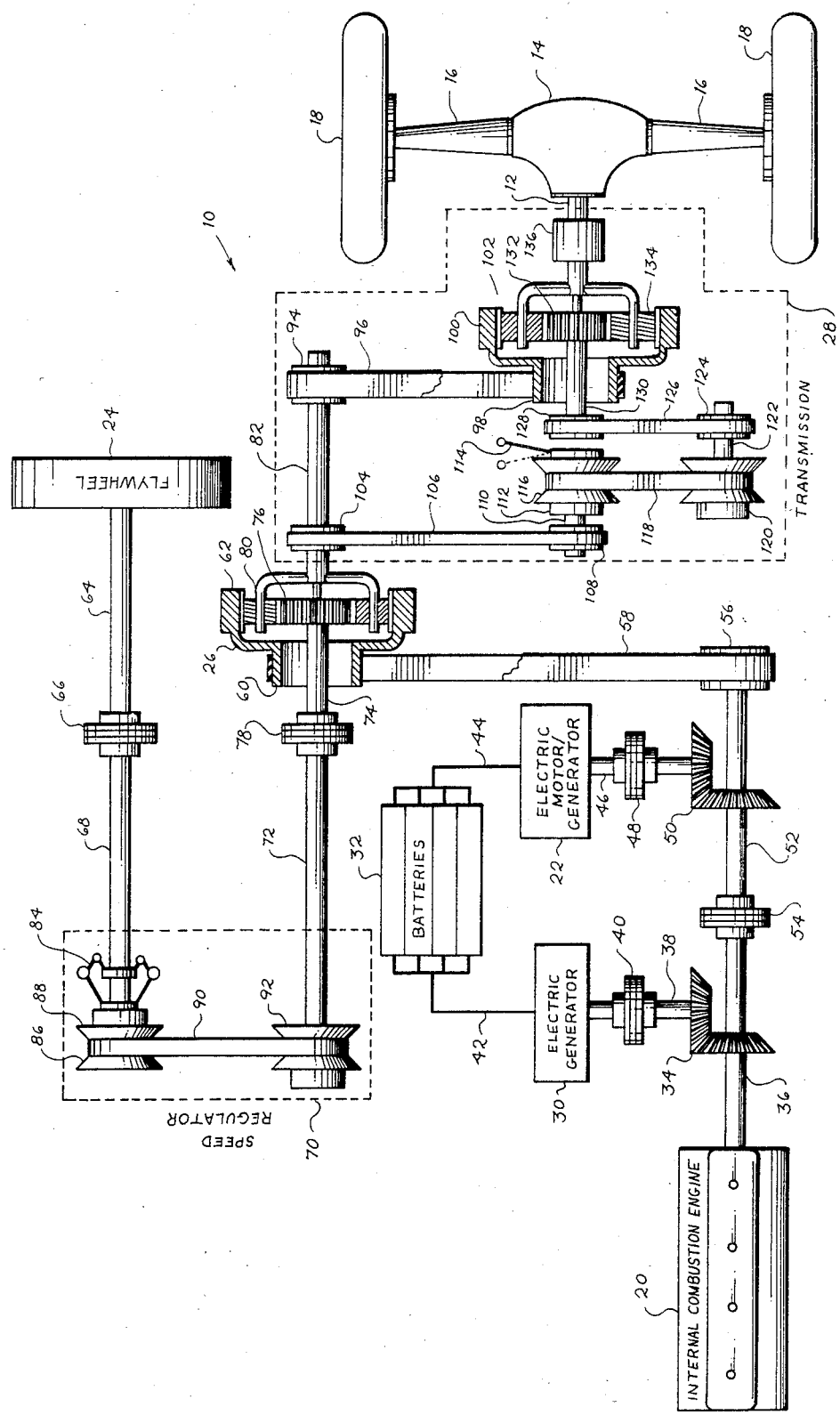
FIG. 1 is a schematic illustration of the preferred embodiment of the hybrid power system for driving a motor vehicle according to the present invention.

In the accompanying drawings, a triple hybrid power system 10 of the preferred embodiment of the present invention is illustrated incorporated in a motor vehicle for powering the drive shaft 12 of the vehicle, which supplied power through a conventional differential 14 to drive a split axle 16 to which the vehicle wheels 18 are fixed.

This triple hybrid system 10 includes three sources of power-producing energy. These being an internal combustion engine 20, an electric motor/generator 22 and a flywheel 24, all connected through a planetary gear set 26 to deliver power to a variable drive transmission 28 for transmitting power to the drive shaft 12 and wheels 18.

The internal combustion engine 20 is of any conventional type normally used for powering motor vehicles, but is of substantially less size and capability than a normal internal combustion engine used as the sole source of power for a comparably sized motor vehicle. This internal combustion engine 20 needs to be only of sufficient size and capability to provide the power necessary to maintain the vehicle travelling at a constant speed on level ground after that speed has been obtained, and requires no additional capacity for powering the vehicle up to the maximum normal travelling speed or for accelerating the vehicle during passing or otherwise.

Except when the internal combustion engine 20 is being used to maintain the vehicle at a constant speed on level ground, it is connected to an electric generator 30 for generating electrical energy to charge a bank of electric storage batteries 32. For purposes of illustration only, this connection of the internal combustion engine 20 to the generator 30 is shown as a bevel gear set 34 drivingly connecting the output shaft 36 of the internal combustion engine 20 to the input shaft 38 of the generator 30, with a generator clutch 40 being disposed in the input shaft 38 of the generator 30 to connect or disconnect the output of the internal combustion engine 20 to the generator 30. The output of the generator 30 is transmitted through cables 42 to the bank of batteries 32, which accumulates and stores the electrical energy for driving the motor/generator 22, which responds to the power demands of the vehicle.

Thus, the bank of batteries 32 separates the internal combustion engine 20 from the fluctuating power demands of the vehicle so that the internal combustion engine can be driving at a substantially constant output within its range of peak efficiency operation without having to fluctuate to respond to vehicle power demands and without having to be of sufficient size and capability to respond to such variations in demand. Therefore, a less powerful and relatively inexpensive internal combustion engine can be utilized and it can be economically operated with comparable fuel savings in its efficient optimum operating range.

The batteries 32 are connected by cables 44 to the electric motor/generator 22 to provide the power for operating the motor/generator to produce mechanical output to be applied to driving the vehicle through the motor/generator output shaft 46 that includes a motor/generator clutch 48. For purposes of illustration only, the motor/generator output shaft 46 is shown connected through a bevel gear set 50 to an intermediate shaft 52 illustrated as being axially aligned with the output shaft 36 of the combustion engine 20, to which output shaft 36 the intermediate shaft 52 is engagable and disengagable by an intermediate clutch 54.

The intermediate shaft 52 is drivingly connected to the planetary gear set 26 through a pulley 56 mounted on the intermediate shaft 52 for driving a belt 58 that is trained around the hub 60 of the ring gear 62 of the planetary gear set 26 for driving thereof. This pulley/belt drive is shown simply as a diagramatic manner of illustrating a possible drive connection.

The flywheel 24 is of any conventional type, such as a type that is of known application for use in motor vehicles, preferably being encased within a housing, the interior of which is maintained in a vacuum for minimum friction loss of the revolving flywheel. The output shaft 64 of the flywheel 24 is connected through a flywheel clutch 66 to a shaft extension 68 that drives a speed regulator 70 that is connected to an output shaft 72 axially aligned with the shaft 74 of the sun gear 76 of the planetary gear set 26, with a brake 78 disposed between the speed regulator output shaft 72 and the sun gear shaft 74 for locking the sun gear shaft 74 and sun gear 76 against rotation when the brake is activated.

The planetary gear set 26 includes a spider gear assembly 80 that drives the output shaft 82 of planetary gear set 26, which in turn is the drive for the variable drive transmission 28 for powering the motor vehicle on which the system is mounted.

The speed regulator 70 may be of any conventional type that is responsive to variations in the speed of rotation of the input shaft 68 to regulate the output so that the output shaft 72 maintains a substantially constant rotational speed for input through the sun shaft 74 to the sun gear 76 of the planetary gear set 26. This speed regulator 70 may, for example, be, as illustrated diagramatically, a centrifugally operable mechanism 84 that mechanically separates the sheaves 86 of a variable pulley 88 that drives the speed regulator belt 90 that is trained around a drive pulley 92 on the output shaft 72 of the speed regulator 70, with the pitch variation of the pulley 88 adjusted in relation to the action of the centrifugal acting mechanism 84 to close the sheaves 86 of the variable pitched pulley 88 as the speed of the flywheel output shaft 64 decreases as the kinetic energy in the flywheel 24 is being used up, with the closing of the sheaves 86 being proportional to the decrease in flywheel shaft rotational speed so as to maintain a constant rotational speed of the drive pulley 92. Another type of speed regulator that could be utilized as well is the variable speed traction drive sold under the trademark VERNIspeed by Plessey Dynamics Corporation of Hillside, N.J. Also, a system could be used of a conventional type that has centrifugally acting balls retained between two spring-biased plates with tapering outer edges against which the balls act in response to centrifugal force to spread the plates and thereby close the connected sheaves.

With this constant speed of rotation of the input shaft 74 of the sun gear 76 of the planetary gear set 26, the input from the electric motor/generator 22 through the ring gear 62 can be maintained generally in a peak efficiency range rather than fluctuating in response to the vehicle load over a range that would require the motor/generator to operate in inefficient ranges. Therefore, efficiency of operation and economy of energy requirements is enhances considerably in comparison with other types of flywheel-assisted power systems that operate without any similar speed regulation, and provide a much simpler, less expensive and more easily servicable arrangement than complicated transmission systems that attempt to accomplish similar purposes in different manners.

The variable drive transmission 28 illustrated in simple form for demonstrative purposes only is seen to include a main drive pulley 94 that drives a belt 96 trained around the hub 98 of the ring gear 100 of the transmission planetary gear set 102. A secondary drive pulley 104 drives a belt 106 that is trained around a pulley 108 that drives the input shaft 110 of a variable pitch pulley that is manipulated manually or automatically by a lever 114 that spreads or closes the sheaves 116 of the variable pitch pulley 112 to change the pitch diameter that is engaged by a belt 118 that in turn is trained around an intermediate pulley 120 on an intermediate shaft 122 that carries an output shaft 124 for driving a belt 126 trained around a pulley 128 on the shaft 130 of the sun gear 132 of the transmission planetary gear set 102. The spider gear assembly 134 of the transmission planetary gear set 102 is connected to the drive shaft 12 of the vehicle for driving the axle 16 and wheels 18 from the transmission planetary gear set 102. A reversing gear 136 is contained in the drive shaft 12 to reverse the application of power to the wheels 18 for forward or reverse drive.

With this drive transmission 28, adjustment through the lever 114 will redistribute the drive application to the transmission planetary gear set 102 for applying the power received from the internal combustion engine 20, motor/generator 22 and flywheel 24 through the planetary gear set 26 for driving the vehicle at varying speed-to-power relationships for optimum power application to drive the vehicle under varying conditions.

It would be understood that various other types of variable drive transmission mechanisms can be used in place of that illustrated, which is illustrated for simplicity of disclosure only.

The variable drive transmission 28, not only serves to transmit power from the energy sources to the drive shaft 12, but, importantly, also serves to transmit regenerative energy developed during braking conditions of the vehicle back through the drive shaft 12 and transmission 28 to the planetary gear set 26 and, therefore, back to the flywheel 24 and motor/generator 22, thereby transferring kinetic energy that is accumulated and stored in the flywheel 24 and generating electrical energy through the motor/generator 22 for recharging the batteries 32. This application of regenerative energy in the nature of a braking force is accomplished by adjustment of the drive transmission components to apply a load to the wheels 18 that is transmitted back to the planetary gear set 26.

During this energy regenerating action, the speed regulator 70 functions in reverse to increase the rotational speed of the flywheel shaft 64 and flywheel 24 as power is being regenerated while maintaining the speed of rotation of the sun gear shaft 74 substantially constant, thereby facilitating the application of regenerative energy to the motor/generator at a speed range within the optimum efficiency range thereof.

Figure 2:
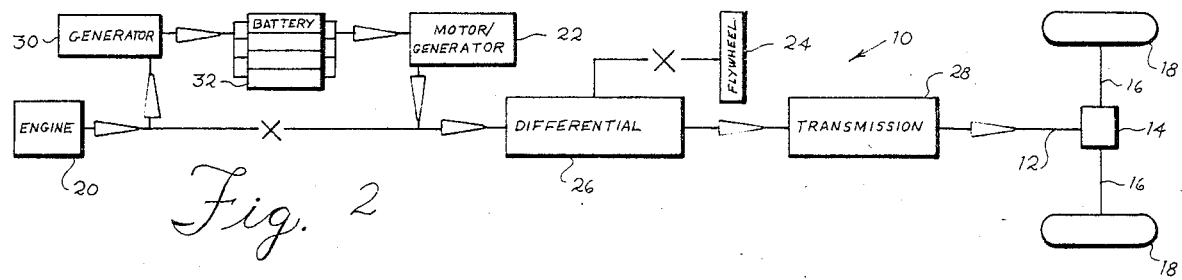
FIGS. 2-7 are schematic illustrations of the various power application and regenerating modes of the hybrid power system of FIG. 1 occuring during the various operating conditions of the system.

The various operating conditions of the triple hybrid power system 10 of the illustrated embodiment is described in relation to the schematic illustrations of FIGS. 2-7 as follows:

When first starting the power system 10, the internal combustion engine 20 is started and allowed to run with the engine clutch 54 disengaged so that there is no drive connection between the output shaft 36 of the internal combustion engine 20 and the intermediate shaft 52, and all of the drive from the output shaft 36 is transmitted through the bevel gear set 34 and generator clutch 40, which is engaged, to the electric generator 30 for generation of electricity to charge the bank of batteries 32 through the cables 42. This is illustrated in FIG. 2. The batteries could also be charged in a conventional manner from an electrical source during periods of non-use of the vehicle.

When there is sufficient energy stored in the batteries 32, either from the reserve accumulated during previous operation of the vehicle or after initial operation of the internal combustion engine 20, the power system can be operated to drive the vehicle by energizing the electric motor/generator 22 with the electricity from the battery 32 through the cables 44. The output of the motor/generator 22 then is directed through the output shaft 46, engaged motor/generator clutch 48 and bevel gear set 50 to the intermediate shaft 52 that drives the pulley 56 and belt 58 to apply power to the ring gear 62 of the planetary gear set 26. During this start-up, it is assumed that the flywheel 24 is at rest. In which case, the flywheel clutch 66 is disengaged and the sun gear brake 78 is engaged to isolate the flywheel 24 from any power input or output and to lock the sun gear 76 against rotation. Thus, the power delivered from the motor/generator 22 to the planetary gear set 26 causes the power from the motor/generator 22 to be delivered through the spider gear assembly 80 to the drive transmission 28 for powering the vehicle for normal driving.

If there is any residual kinetic energy in the flywheel 24 when the vehicle is started, such kinetic energy can be applied by engaging the clutch 66 to deliver the energy through the speed regulator 70 and shaft 72, with the brake 78 disengaged, to cause rotation of the sun gear 76 and add to the power delivery from the planetary gear set.

Figure 4:
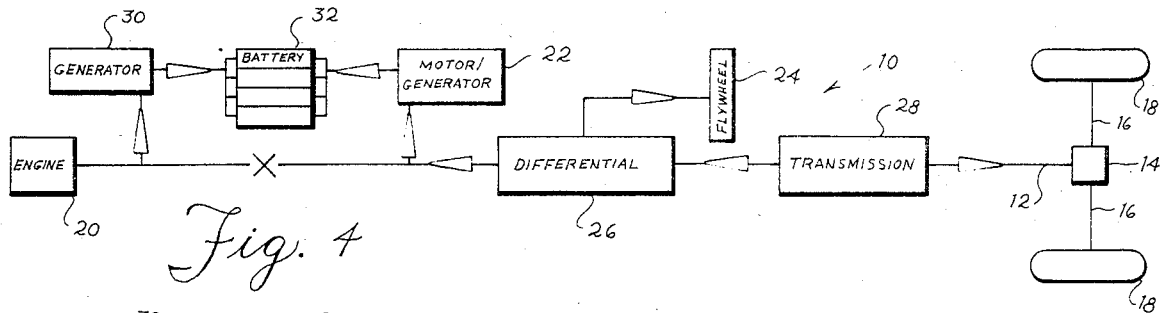

With the power being applied only from the motor/generator 22, the power can be applied primarily within the peak efficiency operating range of the motor/generator, with periodic loading beyond the optimum range when necessary for acceleration and with the power delivery and speed relationship being governed by the drive transmission 28. When it is necessary to forceably reduce the speed of the vehicle that would require applying brakes in a conventional system, the drive transmission 28 is manipulated to cause the braking energy to drive back through the transmission as regenerative power to the planetary gear set 26, at which time the sun gear shaft brake 78 is disengaged to allow rotation of the speed regulator shaft 72 for application of the regenerative braking power to the flywheel for developing kinetic energy reserve in increased rotational speed of the flywheel and the regenerative braking power is also applied through the ring gear 62 to the motor/generator that serves now as a generator to recharge the batteries 32, with the speed regulator 70 controlling the speed of rotation of the sun gear 76 and, therefore, facilitating operation of the motor/generator 22 in its peak efficiency range for enhanced recharging of the batteries 32. This operating condition is illustrated in FIG. 4.

Figure 3:
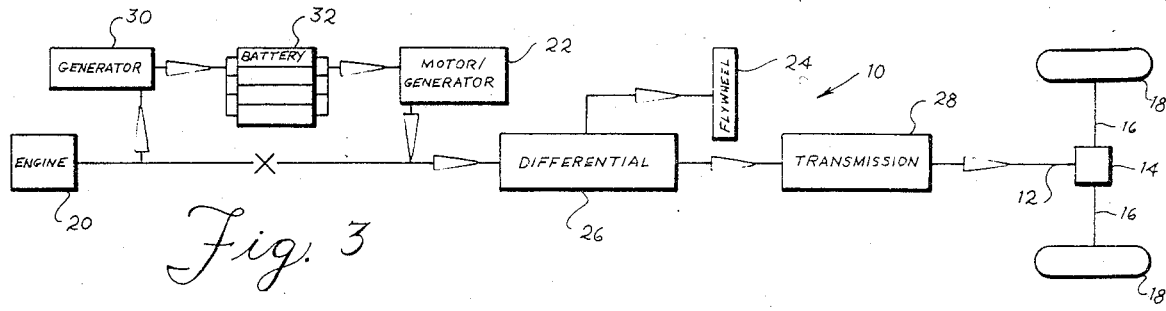

At any time during operation of the vehicle, when the vehicle is coasting without braking or requires less than full power output from the motor/generator, the sun gear brake 78 can be disengaged so that the excess power generated from the motor/generator 22 can be directed through the planetary gear set to the sun gear 76 and thereby to the speed regulator 70 for charging the flywheel 24 with kinetic energy. This running or coasting condition of charging the flywheel is illustrated in FIG. 3.

Figure 5:
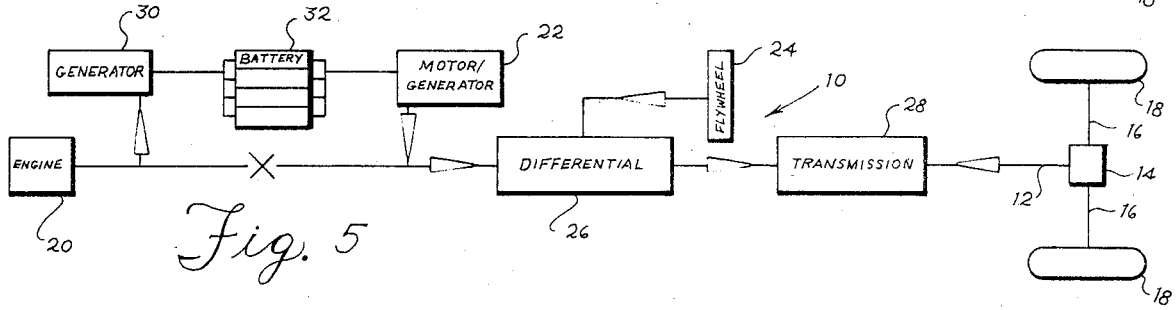

After a vehicle has developed braking power that is applied to charge the flywheel 24, the next time that the vehicle is powered, such as starting from a stop or in accelerating from one speed to another, additional power for faster acceleration than is possible from the motor/generator 22 alone can be obtained by engaging the flywheel clutch 66 to transmit kinetic energy through the speed regulator to the sun gear 76 with the sun gear brake disengaged. In this condition, power is delivered to the transmission 28 by both the flywheel 24 and motor/generator 22. This condition is illustrated in FIG. 5.

Figure 6:
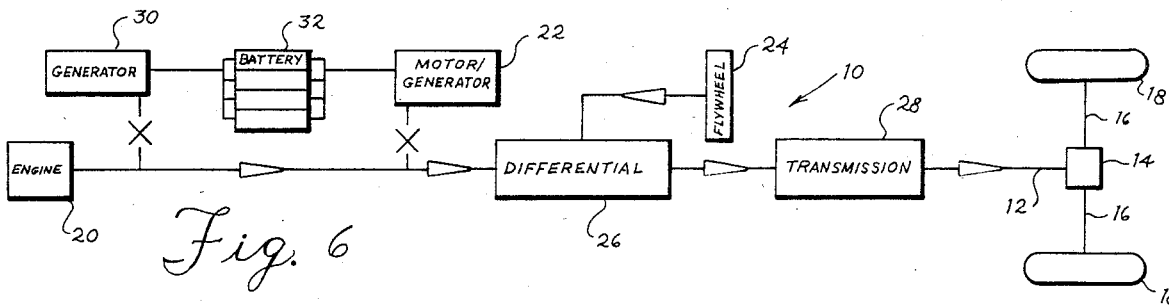
Figure 7:
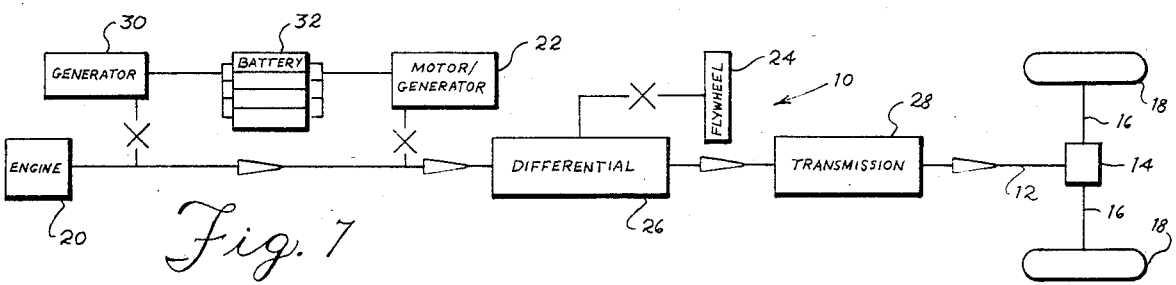

When the vehicle has attained a speed at which it is intended to be driven for an extended period of time, the power system can be switched over to drive the vehicle only from the internal combustion engine 20, which now can operate in its optimum efficiency range for continuous driving of the vehicle with maximum fuel economy. This is accomplished, as illustrated in FIG. 7, by disengaging the generator clutch 40 so that no generating power is delivered from the internal combustion engine to the generator 30, and by disengaging the motor/generator clutch 48 so that no power is delivered by the motor/generator 22, and by engaging the internal combustion engine clutch 54 to connect the engine output shaft 36 directly with the intermediate shaft 52 to drive the planetary gear set 26 directly by the internal combustion engine. During this mode of operation, the sun gear brake 78 is engaged and the flywheel clutch 66 is disengaged to allow the flywheel to run free. During this constant speed operation, should acceleration be required, it can be obtained by taking power from the flywheel 24 by engaging the flywheel clutch 66 and disengaging the sun gear brake 78 to add power from the flywheel to that being delivered by the internal combustion engine 20. This is illustrated in FIG. 6. If greater acceleration is desired, or if there is no kinetic energy reservoir in the flywheel 24, the motor/generator 22 can be energized to apply additional power by engaging the motor/generator clutch 48 and applying the power to the intermediate shaft 52 along with the power being delivered by the internal combustion engine 20.

At any time that it is desired to apply power from only the flywheel, the system can be adapted to do this, preferably by including a brake to lock the ring gear against rotation as the flywheel rotates the sun gear.

It should be understood that, while no particular control system is disclosed herein, a simple electrical or electro-mechanical system can be utilized that is primarily manually controlled or mechanically controlled, or preferably a sophistocated microprocessor can be developed for controlling the various operations in a manner that assures the most efficient mode of operation for particular conditions and is responsive to the various levels of energy stored in the flywheel and batteries and is sensitive to the desired peak efficiency operating ranges of the motor/generator and internal combustion engine. Also, it should be noted that the planetary gear may take other forms than the specification form illustrated.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

We claim:

1. A hybrid power system for driving a motor vehicle comprising: electric storage battery means; an electric motor/generator; means for connecting said battery means to said motor/generator for driving said motor/generator from said battery means or for charging said battery means from said motor/generator; flywheel means for accumulating, storing and discharging kinetic energy; a variable drive transmission; means connecting said electric motor/generator and said flywheel mens to said drive transmission; said electric motor/generator and flywheel connecting means being selectively operable to drive said transmission from said motor/generator and flywheel means in combination; said drive transmission being operable to apply a braking load that develops braking energy which is transmitted by said transmission means to said electric motor/generator and flywheel connecting means being operable to transmit said braking energy to said motor/generator to charge said battery means and to said flywheel means, for accumulating kinetic energy in said flywheel means; and speed regulating means operable to maintain a substantially constant rotational input speed to said electric motor/generator and flywheel connecting means from said flywheel means in response to variations in the rotational speed of the output from said flywheel means.

2. A hybrid power system for driving a motor vehicle according to claim 1 and characterized further in that said electric motor/generator and flywheel connecting means includes a planetary gear set connected for driving input from said motor/generator and said flywheel means and for driving output to said variable drive transmission.

3. A hybrid power system for driving a motor vehicle according to claim 2 and characterized further in that said motor/generator is connected to the ring gear of said planetary gear set, said flywheel means is connected to the sun gear of said planetary gear set, and said transmission is connected to the spider assembly of said gear set.

4. A triple hybrid power system for driving a motor vehicle comprising: an internal combustion engine having an optimum efficiency operating range; an electric generator; means operable to connect the output of said internal combustion engine to said generator; a bank of electric storage batteries chargeably connected to the output of said generator for charging of said batteries by operation of said engine in said optimum efficiency operating range; an electric motor; means for connecting said batteries to said motor for driving said motor from said batteries; flywheel means for accumulating, storing and discharging kinetic energy; a variable drive transmission; means for connecting said electric motor and said flywheel means to said drive transmission; said electric motor and flywheel connecting means being selectively operable to drive said transmission from said electric motor alone, from said flywheel means alone, or from both said motor and flywheel means in combination; said drive transmission being operable to apply a braking load that develops braking energy which is transmitted by said transmission means to said electric motor and flywheel connecting means; said electric motor and said flywheel connecting means being operable to transmit said braking energy to said flywheel means for accumulating kinetic energy therein; and speed regulating means operable to maintain a substantially constant rotational input speed to said electric motor and flywheel connecting means from said flywheel means in response to variations in the rotational speed of the output from said flywheel means.

5. A triple hybrid power system for driving a motor vehicle comprising: an internal combustion engine having an optimum efficiency operating range; an electric generator; means operable to connect the output of said internal combustion engine to said generator; a bank of electric storage batteries chargeably connected to the output of said generator for charging of said batteries by operation of said engine in said optimum efficiency operating range; an electric motor; means for connecting said batteries to said motor for driving said motor from said batteries; flywheel means for accumulating, storing and discharging kinetic energy; a variable drive transmission; means for connecting said electric motor and said flywheel means to said drive transmission; said electric motor and flywheel connecting means being selectively operable to drive said transmission from said electric motor alone, from said flywheel means alone, or from both said motor and flywheel means in combination; said drive transmission being operable to apply a braking load that develops braking energy which is transmitted by said transmission means to said electric motor and flywheel connecting means; said electric motor and said flywheel connecting means being operable to transmit said braking energy to said flywheel means for accumulating kinetic energy therein; said electric motor and flywheel connecting means including a planetary gear set connected for driving input from said electric motor and said flywheel means and for driving output to said variable drive transmission, and said electric motor being connected to the ring gear of said planetary gear set, said flywheel means being connected to the sun gear of said planetary gear set, and said transmission being connected to the spider assembly of said gear set.

6. A triple hybrid power system for driving a motor vehicle according to claim 5 and characterized further by speed regulating means operable to maintain a substantially constant rotational input speed to said electric motor and flywheel connecting means from said flywheel means in response to variations in the rotational speed of the output from said flywheel means.

7. A triple hybrid power system for driving a motor vehicle comprising: an internal combustion engine having an optimum efficiency operating range; an electric generator; means operable to connect the output of said internal combustion engine to said generator; a bank of electric storage batteries chargeably connected to the output of said generator for charging of said batteries by operation of said engine in said optimum efficiency operating range; an electric motor; means for connecting said batteries to said motor for driving said motor from said batteries; flywheel means for accumulating, storing and discharging kinetic energy; a variable drive transmission; means for connecting said electric motor and said flywheel means to said drive transmission; said electric motor and flywheel connecting means being selectively operable to drive said transmission from said electric motor alone, from said flywheel means alone, or from both said motor and flywheel means in combination; said drive transmission being operable to apply a braking load that develops braking energy which is transmitted by said transmission means to said electric motor and flywheel connecting means; said electric motor and said flywheel connecting means being operable to transmit said braking energy to said flywheel means for accumulating kinetic energy therein; said electric motor and flywheel connecting means including means for connecting the output of said internal combustion engine to said drive transmission for driving the motor vehicle directly from said internal combustion engine; said electric motor and flywheel connecting means including a planetary gear set connected for driving input from said electric motor and said flywheel means and for driving output to said variable drive transmission and said electric motor and flywheel connecting means being operable to connect said internal combustion engine to said flywheel means through said planetary gear set for transferring energy from said engine into kinetic energy in said flywheel means.

8. A triple hybrid power system for driving a motor vehicle comprising: an internal combustion engine having an optimum efficiency operating range; an electric generator; means operable to connect the output of said internal combustion engine to said generator; a bank of electric storage batteries chargeably connected to the output of said generator for charging of said batteries by operation of said engine in said optimum efficiency operating range; an electric motor; means for connecting said batteries to said motor for driving said motor from said batteries; flywheel means for accumulating, storing and discharging kinetic energy; a variable drive transmission; means for connecting said electric motor and said flywheel means to said drive transmission; said electric motor and flywheel connecting means being selectively operable to drive said transmission from said electric motor alone, from said flywheel means alone, or from both said motor and flywheel means in combination; said drive transmission being operable to apply a braking load that develops braking energy which is transmitted by said transmission means to said electric motor and flywheel connecting means; said electric motor and said flywheel connecting means being operable to transmit said braking energy to said flywheel means for accumulating kinetic energy therein; said electric motor and flywheel connecting means including means for connecting the output of said internal combustion engine to said drive transmission for driving the motor vehicle directly from said internal combustion engine; said electric motor and flywheel connecting means including a planetary gear set connected for driving input from said electric motor and said flywheel means and for driving output to said variable drive transmission, and said electric motor and flywheel connecting means being operable to connect said electric motor to said flywheel means through said planetary gear set for transferring energy from said motor into kinetic energy in said flywheel means.

9. A triple hybrid power system for driving a motor vehicle comprising: an internal combustion engine having an optimum efficiency operating range; an electric generator; means operable to connect the output of said internal combustion engine to said generator; a bank of electric storage batteries chargeably connected to the output of said generator for charging of said batteries by operation of said engine in said optimum efficiency operating range; an electric motor; means for connecting said batteries to said motor for driving said motor from said batteries; flywheel means for accumulating, storing and discharging kinetic energy; a variable drive transmission; means for connecting said electric motor and said flywheel means to said drive transmission; said electric motor and flywheel connecting means being selectively operable to drive said transmission from said electric motor alone, from said flywheel means alone, or from both said motor and flywheel means in combination; said drive transmission being operable to apply a braking load that develops braking energy which is transmitted by said transmission means to said electric motor and flywheel connecting means; said electric motor and said flywheel connecting means being operable to transmit said braking energy to said flywheel means for accumulating kinetic energy therein; said electric motor and flywheel connecting means including means for connecting the output of said internal combustion engine to said drive transmission for driving the motor vehicle directly from said internal combustion engine; said electric motor and flywheel connecting means including a planetary gear set connected for driving input from said electric motor and said flywheel means, and selectively connected to said internal combustion engine, for driving output to said variable drive transmission, and said electric motor and flywheel connecting means being operable to connect said internal combustion engine to said flywheel means through said planetary gear set for transferring energy from said engine into kinetic energy in said flywheel means.

10. A triple hybrid power system for driving a motor vehicle according to claim 9 and characterized further in that said electric motor and flywheel connecting means is operable to connect said electric motor to said flywheel means through said planetary gear set for transferring energy from said motor into kinetic energy in said flywheel means.

11. A triple hybrid power system for driving a motor vehicle comprising: an internal combustion engine having an optimum efficiency operating range; an electric generator; means operable to connect the output of said internal combustion engine to said generator; a bank of electric storage batteries chargeably connected to the output of said generator for charging of said batteries by operation of said engine in said optimum efficiency operating range; an electric motor; means for connecting said batteries to said motor for driving said motor from said batteries; flywheel means for accumulating, storing and discharging kinetic energy; a variable drive transmission; means for connecting said electric motor and said flywheel means to said drive transmission; said electric motor and flywheel connecting means being selectively operable to drive said transmission from said electric motor alone, from said flywheel means alone, or from both said motor and flywheel means in combination; said drive transmission being operable to apply a braking load that develops braking energy which is transmitted by said transmission means to said electric motor and flywheel connecting means; said electric motor and said flywheel connecting means being operable to transmmit said braking energy to said flywheel means for accumulating kinetic energy therein; said electric motor and flywheel connecting means including means for connecting the output of said internal combustion engine to said drive transmission for driving the motor vehicle directly from said internal combustion engine; said electric motor and flywheel connecting means including a planetary gear set connected for driving input from said electric motor and said flywheel means, and selectively connected to said internal combustion engine, for driving output to said variable drive transmission; and said motor being connected to the ring gear of said planetary gear set, said flywheel means being connected to the sun gear of said planetary gear set, said transmission being connected to the spider assembly of said gear set, and said internal combustion engine is selectively connected directly to said ring gear.

12. A triple hybrid power system for driving a motor vehicle comprising: an internal combustion engine having an optimum efficiency operating range; an electric generator; means operable to connect the output of said internal combustion engine to said generator; a bank of electric storage batteries chargeably connected to the output of said generator for charging of said batteries by operation of said engine in said optimum efficiency operating range; an electric motor; means for connecting said batteries to said motor for driving said motor from said batteries; flywheel means for accumulating, storing and discharging kinetic energy; a variable drive transmission; means for connecting said electric motor and said flywheel means to said drive transmission; said electric motor and flywheel connecting means being selectively operable to drive said transmission from said electric motor alone, from said flywheel means alone, or from both said motor and flywheel means in combination; said drive transmission being operable to apply a braking load that develops braking energy which is transmitted by said transmission means to said electric motor and flywheel connecting means; said electric motor and said flywheel connecting means being operable to transmit said braking energy to said flywheel means for accumulating kinetic energy therein; said electric motor being a motor/generator, and said electric motor and flywheel connecting means being operable to transmit said braking energy to said motor/generator to charge said batteries; said electric motor and flywheel connecting means including a planetary gear set connected for driving input from said motor/generator and said flywheel means and for driving output to said variable drive transmission; and said motor/generator being connected to the ring gear of said planetary gear set, said flywheel means being connected to the sun gear of said planetary gear set, and said transmission being connected to the spider assembly of said gear set.

13. A triple hybrid power system for driving a motor vehicle according to claim 12 and characterized further by speed regulating means operable to maintain a substantially constant rotational input speed to said electric motor and flywheel connecting means from said flywheel means in response to variations in the rotational speed of the output from said flywheel means.

14. A triple hybrid power system for driving a motor vehicle comprising: an internal combustion engine having an optimum efficiency operating range; an electric generator; means operable to connect the output of said internal combustion engine to said generator; a bank of electric storage batteries chargeably connected to the output of said generator for charging of said batteries by operation of said engine in said optimum efficiency operating range; an electric motor; means for connecting said batteries to said motor for driving said motor from said batteries; flywheel means for accumulating, storing and discharging kinetic energy; a variable drive transmission; means for connecting said electric motor and said flywheel means to said drive transmission; said electric motor and flywheel connecting means being selectively operable to drive said transmission from said electric motor alone, from said flywheel means alone, or from both said motor and flywheel means in combination; said drive transmission being operable to apply a braking load that develops braking energy which is transmitted by said transmission means to said electric motor and flywheel connecting means; said electric motor and said flywheel connecting means being operable to transmit said braking energy to said flywheel means for accumulating kinetic energy therein; said electric motor being a motor/generator, and said electric motor and flywheel connecting means being operable to transmit said braking energy to said motor/generator to charge said batteries; said electric motor and flywheel connecting means including a planetary gear set connected for driving input from said motor generator and said flywheel means and for driving output to said variable drive transmission; and said electric motor and flywheel connecting means being operable to connect said internal combustion engine to said flywheel means through said planetary gear set for transferring energy from said engine into kinetic energy in said flywheel means.

15. A triple hybrid power system for driving a motor vehicle according to claim 14 and characterized further in that said electric motor and flywheel means, and selectively connected to said internal combustion engine, for driving output to said variable drive transmission.

16. A triple hybrid power system for driving a motor vehicle according to claim 15 and characterized further in that said motor/generator is connected to the ring gear of said planetary gear set, said flywheel means is connected to the sun gear of said planetary gear set, said transmission is connected to the spider assembly of said gear set, and said internal combustion engine is selectively connected directly to said ring gear.

* * * * *